McDONALD H. WILSON.
CORN PLANTER.
APPLICATION FILED OCT. 13, 1911.
1,045,087.
Patented Nov. 19, 1912.
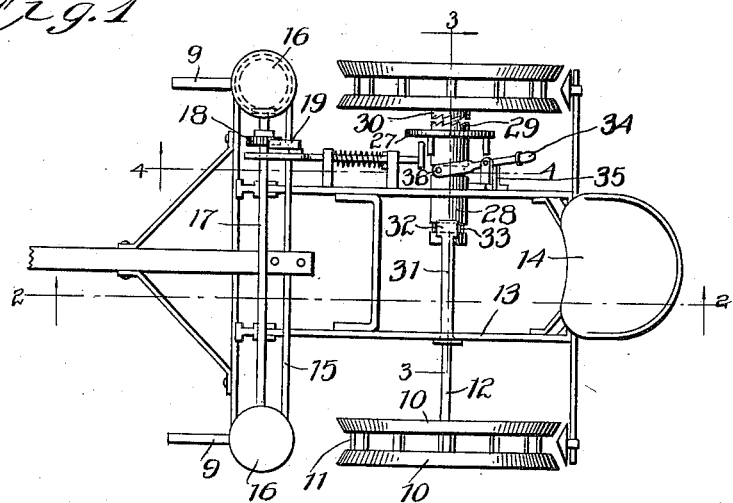
Fig. 1
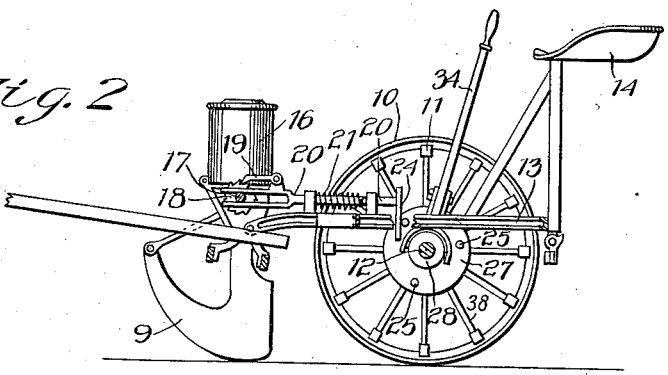
Fig. 2
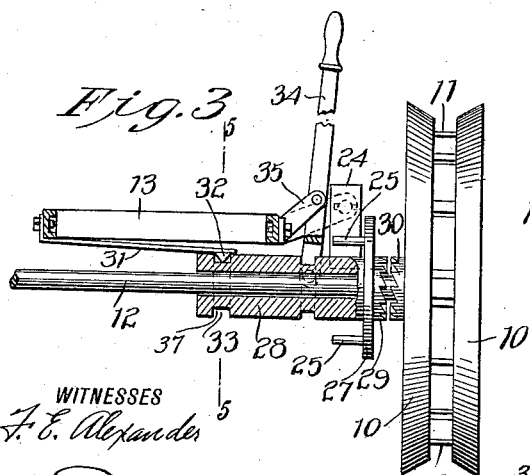
Fig. 3
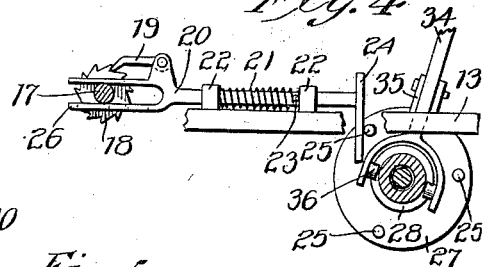
Fig. 4
Fig. 5
WITNESSES
F. E. Alexander
INVENTOR
McDonald H. Wilson
BY Munn & Co
ATTORNEYS

UNITED STATES PATENT OFFICE.

McDONALD HARDCASTLE WILSON, OF LEXINGTON, MISSOURI.

CORN-PLANTER.

1,045,087.  Specification of Letters Patent.  Patented Nov. 19, 1912.

Application filed October 13, 1911.  Serial No. 654,460.

*To all whom it may concern:*

Be it known that I, McDONALD H. WILSON, a citizen of the United States, and a resident of Lexington, in the county of Lafayette and State of Missouri, have invented a new and Improved Corn-Planter, of which the following is a full, clear, and exact description.

Among the principal objects which the present invention has in view are: to provide a driving mechanism for the dropper operable by the carrying wheels of the planter, which may be regulated as to the initial operation to place the seeds in parallel arrangement in a planted field; and to provide a driving mechanism which is simple, durable and at all times under control.

One embodiment of the present invention is disclosed in the structure illustrated in the accompanying drawings, in which like characters of reference denote corresponding parts in all the views, and in which—

Figure 1 is a plan view of a corn planter constructed and arranged in accordance with the present invention; Fig. 2 is a longitudinal section taken on the line 2—2 in Fig. 1; Fig. 3 is a detail view, on enlarged scale and in vertical section, taken on the line 3—3 in Fig. 1; Fig. 4 is a detail view, on an enlarged scale, and showing in vertical section a portion of the dropper operating mechanism, the section being taken on the line 4—4 in Fig. 1; and Fig. 5 is a cross section on enlarged scale taken on the line 5—5 in Fig. 3.

As seen in the accompanying drawings, the plows or furrow openers 9, 9 are each disposed in front of and in line with the carrying wheels of the vehicle. The fellies of the carrying wheels, as shown, are formed of two inwardly inclined rings 10, 10, said rings being spaced apart and held in position by cross bars 11 to which the spokes 38 of the wheels are intimately secured. The wheels are each loosely mounted upon the axle 12. The axle 12 supports the frame 13 upon which is mounted the driver's seat 14, and the cross frame 15 from which are hung the plows or runners 9 and upon which are supported the hoppers 16 and the dropper mechanism therefor, which dropper mechanism has journaled therein the shaft 17. The mechanisms and structures enumerated are substantially those at present employed.

The present invention primarily consists in the construction and arrangement of the transmission mechanism operatively connecting one of the carrying wheels and the shaft 17.

The shaft 17 has rigidly mounted thereon a ratchet wheel 18, engaged with the ratchet teeth whereof is a swinging gravity pawl 19. As seen best in Fig. 4 of the drawings, the pawl 19 operates only when the plunger 20 is moved in a forward direction, the said pawl over-riding the teeth of the ratchet wheel 18 when the said plunger is retracted or drawn backward by the operation of the spiral spring 21.

The plunger 20 is slidably mounted in bearings formed in the brackets 22. The spring 21 rests between the forward bracket 22 and a pin 23 driven through the plunger 20 to receive and hold one end of the said spring 21. The normal operation of the spring 21 thus arranged is to force backward toward the rear of the machine the plunger 20, and to force the foot plate 24 with which the plunger is provided in the path of the pintles 25. The forward end of the plunger 20 is bifurcated to form the yoke 26, the arms whereof straddle the shaft 17 and serve as a guide for the operation of the plunger 20 and the pawl 19 mounted thereon.

The pintles 25 are set out from the face of a disk 27, which disk is rigidly mounted on the drum 28. The drum 28 is normally rotatively and slidably mounted on the axle 12, and is provided at the outer end with the ratchet clutch teeth 29 which engage corresponding teeth on the hub 30 of one of the carrying wheels. The pitch of the teeth on the hub 30 and drum 28 is such as to engage when the carrying wheel is rotated in a forward direction, and to disengage or override when the said carrying wheel is rotated in the opposite direction, as in the backing of the vehicle. In this manner is prevented any possible breakage resultant upon the pintles 25 engaging the plate 24 from in front, which would result from rotating the disk 27 backward, as seen best in Fig. 4 of the drawings. It will be understood that the pintles 25 are of a length to engage the plate 24 when the drum 28 is shifted laterally to engage the hub 30.

The drum 28 is normally held out of engagement with the hub 30 by a flat spring 31. The spring 31 is provided with a head 32 the sides whereof are tapered or inclined to ride into and out of the annular groove 33 when sufficient pressure is exerted upon the drum 28 to lift the head 32 from the said groove. The spring 31 is suitably secured to one of the side bars of the frame 13, as seen best in Fig. 1 of the drawings.

The drum 28 is shifted by manipulating the lever 34. The lever 34 is suitably mounted in bearings in standards 35, and is provided with pins 36 to engage a suitable groove formed in the drum 28, as shown in Figs. 1 and 4 of the drawings. When in the operation of the planter the carrying wheel thereof having the hub 30, is reversed, the ratchet teeth of the said hub, and the ratchet teeth formed on the drum 28 coöperate to move the said drum away from the hub 30. The head 32 of the spring 31 is lifted by this action from behind the drum 28 to rest in the groove 33.

With a planter constructed and arranged as described the operation is as follows: The drum 28 being held by the spring 31 in disengaged relation to the hub 30, the team is driven until the planter is disposed where the dropping mechanism is in position to deposit its first hill of seed in line with the rows previously formed. The driver then grasps the lever 34 and moves the drum 28 until the teeth 29 thereof engage the teeth on the hub 30. If it is necessary to insure the prompt action of the dropping mechanism at the beginning of the rotation of the carrying wheel, this is secured by partly rotating the drum 28 until one of the pintles 25 rests against the foot plate 24. In this position of the drum 28 the head 32 of the spring 31 rests behind the drum 28 and holds the teeth 29 of the same in engagement with the teeth of the hub 30 during the continuation of the operation. As each of the pintles 25 strike the foot plate 24 it forces the same and the plunger 20 and the pawl 19 forward. The pawl 19 engages the teeth of the ratchet wheel 18 to partially rotate the same and the shaft 17 on which it is mounted. The dropper mechanism connected with the shaft 17 and disposed in each of the hoppers 16 is thereby operated at regular intervals during the progress of the planter.

It is the intention of the operation to drop the seeds at a definite point in the row being planted, the failure to do which is an objection under which the usual check wire operated machines have labored. The disadvantage encountered in the employment of the check wire is thus avoided by the employment of a suitable operating mechanism for the dropping mechanism, which operating mechanism is actuated from and by the carrying wheels of the machine.

To prevent lost motion in the drum 28 and to avoid the retraction of the same when for any reason the vehicle, or the power traction wheel thereof is reversed in its movement, the head 32 is beveled as seen in Figs. 3 and 5 of the drawings, and the groove 33 has formed therein the rearwardly faced ratchet teeth 37 to be engaged thereby.

Having thus described my invention, what I claim as new and desire to secure by Letters Patent is:—

1. In a corn planter such as described, having seed-droppers, a supporting frame and carrying wheels therefor; a transmission mechanism operatively connecting one of said carrying wheels and said dropping mechanism, comprising a ratchet toothed member fixedly mounted on one of said carrying wheels and disposed concentric therewith, the teeth of said ratchet toothed member being forwardly pitched; a drum slidably and rotatively mounted on the axle of said frame, having ratchet teeth rearwardly pitched to engage the ratchet teeth on said carrying wheels; a plurality of thrust members mounted on said drum to successively actuate said droppers; and a pawl to engage said drum, to prevent the rearward rotation thereof.

2. In a corn planter such as described, having seed-droppers, a supporting frame and carrying wheels therefor; a transmission mechanism operatively connecting one of said carrying wheels and said dropping mechanism, comprising a ratchet toothed member fixedly mounted on one of said carrying wheels and disposed concentric therewith, the teeth of said ratchet toothed member being forwardly pitched; a drum slidably and rotatively mounted on the axle of said frame, having ratchet teeth rearwardly pitched to engage the ratchet teeth on said carrying wheels; a plurality of thrust members mounted on said drum to successively actuate said droppers; and a pawl to engage said drum, to prevent the rearward rotation thereof, said pawl being provided with a head adapted to yieldingly hold said drum in engagement with the ratchet member on said wheel.

In testimony whereof I have signed my name to this specification in the presence of two subscribing witnesses.

McDONALD HARDCASTLE WILSON.

Witnesses:
W. B. WILSON,
J. O. LESUEUR.

Copies of this patent may be obtained for five cents each, by addressing the "Commissioner of Patents, Washington, D. C."